Figure 1:
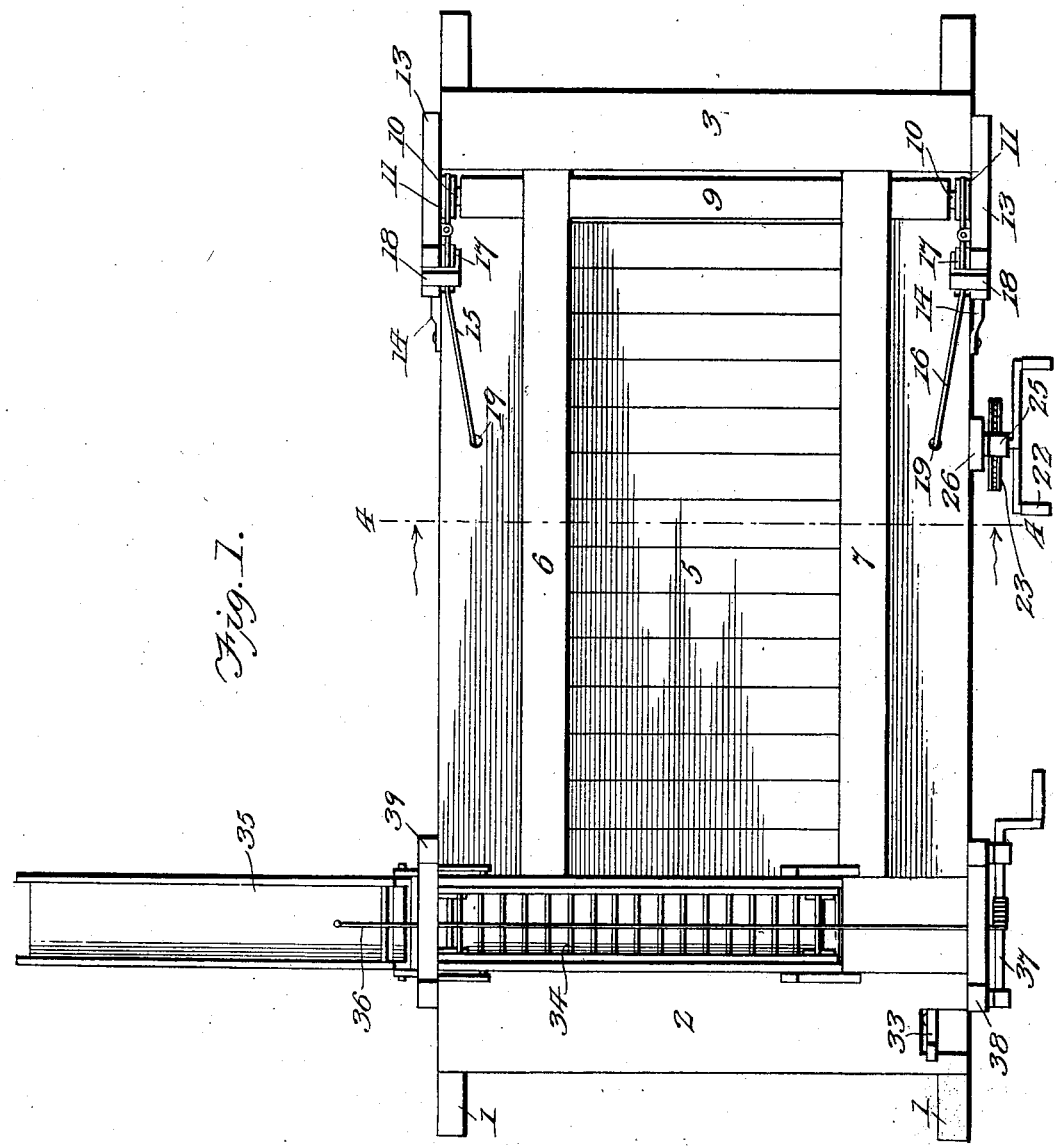

No. 700,115. Patented May 13, 1902.
J. EGLI.
DUMPING APPARATUS.
(Application filed Sept. 16, 1901.)
(No Model.) 3 Sheets—Sheet 1.

Witnesses
Edwin G. McKee
W. Arthur Maddox

John Egli Inventor
By
Victor J. Evans Attorney

No. 700,115. Patented May 13, 1902.
J. EGLI.
DUMPING APPARATUS.
(Application filed Sept. 16, 1901.)
(No Model.) 3 Sheets—Sheet 2.
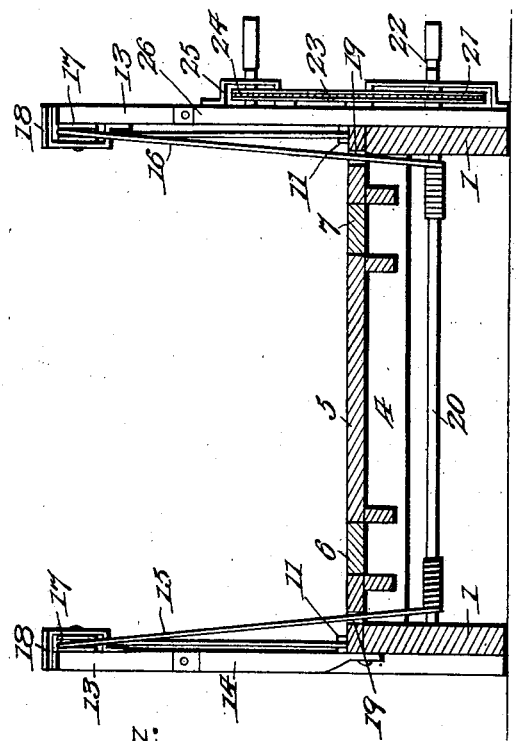
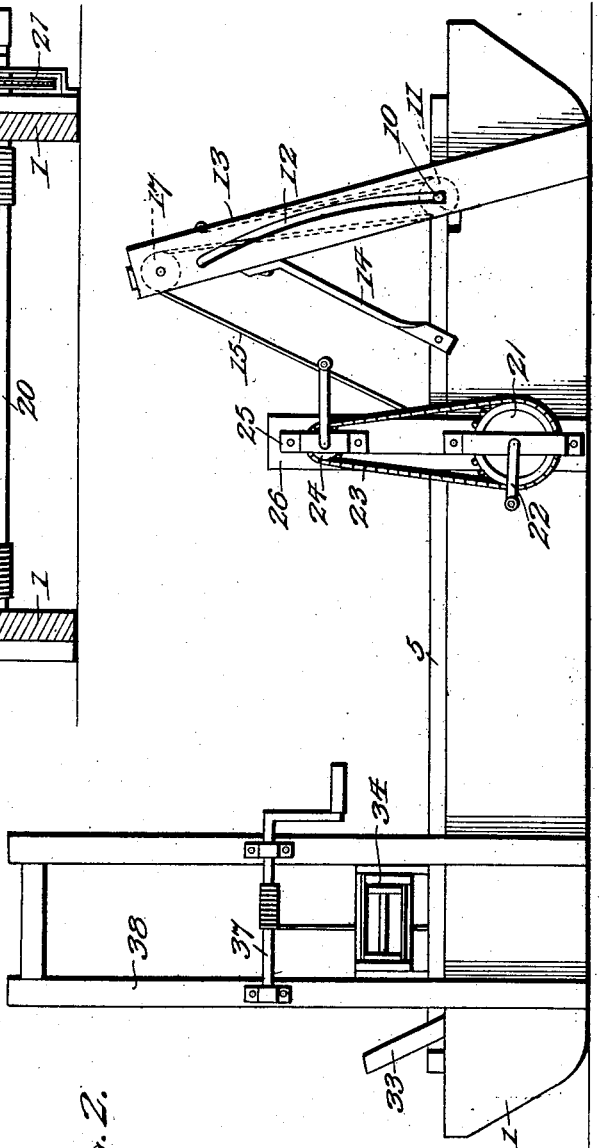
John Egli Inventor
Witnesses
Edwin G. McKee
W. Arthur Maddox
By
Victor J. Evans Attorney No. 700,115. Patented May 13, 1902.
J. EGLI.
DUMPING APPARATUS.
(Application filed Sept. 16, 1901.)
(No Model.) 3 Sheets—Sheet 3.
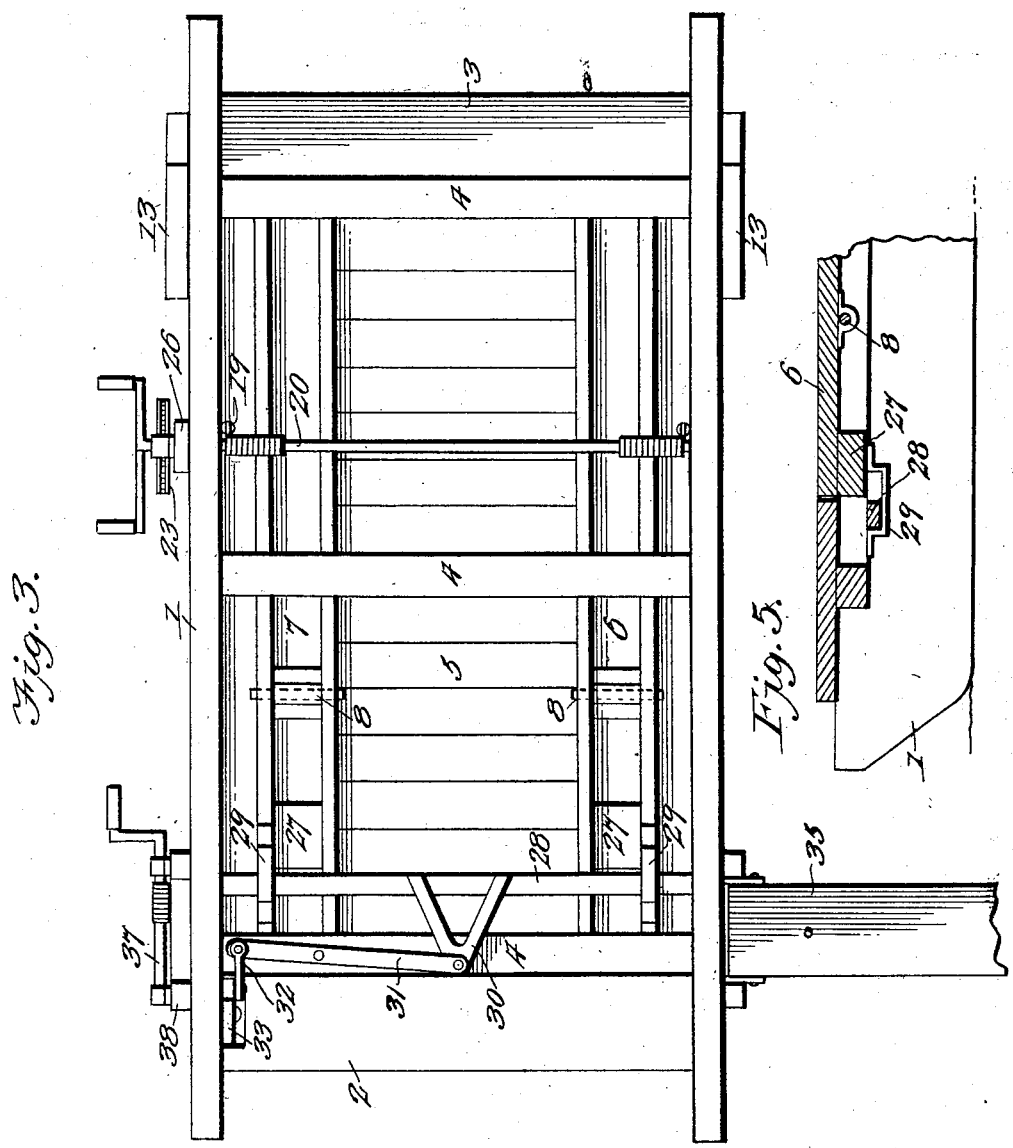

UNITED STATES PATENT OFFICE.

JOHN EGLI, OF MINIER, ILLINOIS.

DUMPING APPARATUS.

SPECIFICATION forming part of Letters Patent No. 700,115, dated May 13, 1902.

Application filed September 16, 1901. Serial No. 75,535. (No model.)

*To all whom it may concern:*

Be it known that I, JOHN EGLI, a citizen of the United States, residing at and whose post-office address is Minier, in the county of Tazewell and State of Illinois, have invented new and useful Improvements in Dumping Apparatus, of which the following is a specification.

My invention relates to dumping apparatus adapted especially for tilting wagons, cars, and the like into dumping position to permit of the ready discharge of their contents.

The object of the invention is to provide an effective apparatus of this character which will be of simple and inexpensive construction and convenient and reliable in operation.

The construction of the improvement will be fully described hereinafter in connection with the accompanying drawings, which form part of this specification, and its novel features will be defined in the appended claims.

In the drawings, Figure 1 is a top plan view of an apparatus embodying the invention. Fig. 2 is a side elevation thereof. Fig. 3 is a reverse or bottom plan of the apparatus. Fig. 4 is a transverse section on the line 4 4 of Fig. 1. Fig. 5 is a detail longitudinal section of the rear end of my invention.

The reference-numeral 1 designates the sides of the frame of the apparatus, connected by end bars 2 and 3 and mortised to receive the platform-supports 4, upon which rests the platform 5.

6 and 7 designate tilting beams pivotally secured at opposite sides of the platform, as shown at 8, and connected at their forward ends by a cross-bar 9, the ends of which project beyond the tilting beams and carry journals 10, upon which are mounted pulleys 11. The ends of the journals 10 extend into curved slots 12, formed in the rearwardly-inclined bars 13, secured to the sides 1 and braced thereto by braces 14.

15 and 16 designate cords, each secured at one end to the upper end of one of the bars 13, thence passing under the pulleys 11 and over pulleys 17, supported in the brackets 18 at the upper ends of the bars 13, and finally through openings 19 in the frame to a shaft 20, to which the cords are attached.

The shaft 20 is supported in bearings formed in the sides 1 and carries on one end beyond the frame a sprocket-wheel 21 and a crank 22, said sprocket being connected by a chain 23 with a sprocket-wheel 24, mounted in a bracket 25 upon a standard 26 at one side of the frame.

Each of the tilting beams 6 and 7 is provided at its rear end with a weight 27, and said rear ends are engaged by a transverse locking-bar 28, slidably supported below the platform in keepers 29 and pivotally connected by strips 30 to one end of a lever 31, fulcrumed below the platform, the outer end of said lever being pivotally connected by a bent link 32 to a vertically-disposed lever 33, fulcrumed on the inner side of the adjacent side 1.

Normally the locking-bar 28 engages the weighted ends of the beams 6 and 7 and prevents them from tilting. When a wagon has been placed on the beams and it is desired to dump its contents, the lever 33 is pushed rearward, which disengages the locking-bar 28 from the tilting beams, after which by turning the shaft 20 by its crank the cords 15 and 16 are wound upon said shaft, thus elevating the front ends of the beams.

It will be noted that I securely brace the front ends of the beams 6 and 7 together by means of the cross-bar 9 and also guide said cross-bar in the movement of the tilting beams by the slotted bars 13 and the extensions of the journals 10.

The contents of the wagon are adapted to be dumped into a transversely-disposed conveyer 34, located at the rear of the machine and which in turn delivers to a hinged chute 35, the latter being connected by a cord 36 to a crank-shaft 37, mounted in bearings on parallel standards 38. The chute 35 is thus adapted to be turned up against a frame 39 when in use.

I claim—

1. In a dumping apparatus, the combination with a platform; of parallel tilting beams connected at their front ends by a transverse bar, journals secured to the tilting beams, means for tilting said beams, and means for guiding them in their movement, comprising bars having curved slots adapted to receive the said journals.

2. In a dumping apparatus, the combination with a fixed platform; of parallel tilting beams connected at their front ends by a transverse bar, said bar having its ends projecting beyond the tilting beams, means for tilting said beams, and guides secured to the frame adapted to receive the projecting ends of the said transverse bar.

3. In a dumping apparatus, the combination with a platform having keepers secured to its under side, of a pair of tilting beams, means for raising and lowering the same, and means for locking the tilting beams in position comprising a locking-bar slidably mounted in the said keepers, a horizontally-disposed lever fulcrumed below the platform, strips connecting the said locking-bar to one end of the said lever, and a vertically-disposed lever fulcrumed on the frame having its lower end connected to the opposite end of the horizontally-disposed lever.

4. In a dumping apparatus, the combination with a fixed platform of parallel tilting beams connected at their front ends by a transverse bar, means for tilting said beams and means for guiding them in their movement, comprising rearwardly-inclined bars having curved slots and projections from said transverse bar moving in said slots.

5. In a dumping apparatus, the combination with a pair of weighted tilting beams, of a transverse brace connecting the front ends of the beams, journals projecting from the ends of said brace, pulleys on said journals, elevating-cords on said pulleys, inclined bars rising from the frame and having curved slots to receive the ends of said journals, a winding-shaft and crank for said cords, means for locking the beams against movement, a conveyer and a chute adjacent to the conveyer.

In testimony whereof I affix my signature in presence of two witnesses.

JOHN EGLI.

Witnesses:
JOSEPH AUGSBURGER,
E. H. NAFFZIGER.